US012089182B2

(12) United States Patent
Wu et al.

(10) Patent No.: US 12,089,182 B2
(45) Date of Patent: Sep. 10, 2024

(54) RELAY UE-ASSISTED RAN NOTIFICATION AREA UPDATE PROCEDURE

(71) Applicant: Apple Inc., Cupertino, CA (US)

(72) Inventors: Zhibin Wu, Los Altos, CA (US); Dawei Zhang, San Diego, CA (US); Fangli Xu, Beijing (CN); Haijing Hu, Beijing (CN); Longda Xing, San Jose, CA (US); Sethuraman Gurumoorthy, San Jose, CA (US); Srirang A. Lovlekar, Cupertino, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 17/438,147

(22) PCT Filed: Oct. 22, 2020

(86) PCT No.: PCT/CN2020/122711
§ 371 (c)(1),
(2) Date: Sep. 10, 2021

(87) PCT Pub. No.: WO2022/082568
PCT Pub. Date: Apr. 28, 2022

(65) Prior Publication Data
US 2022/0312376 A1    Sep. 29, 2022

(51) Int. Cl.
*H04W 68/06* (2009.01)
*H04W 68/02* (2009.01)
*H04W 68/04* (2009.01)
(52) U.S. Cl.
CPC ........... *H04W 68/06* (2013.01); *H04W 68/02* (2013.01); *H04W 68/04* (2013.01)

(58) Field of Classification Search
CPC ....................................................... H04W 68/06
(Continued)

(56) References Cited

U.S. PATENT DOCUMENTS 10,602,568 B2 *   3/2020   Jung ..................... H04W 48/20
2020/0068646 A1   2/2020   Kwon
(Continued)

FOREIGN PATENT DOCUMENTS

WO    2019202516         4/2019
WO    2020064384 A1      4/2020

OTHER PUBLICATIONS

International Search Report for PCT Patent Application No. PCT/CN2020/122711; mailed Jul. 22, 2021.
(Continued)

*Primary Examiner* — Qutbuddin Ghulamali
(74) *Attorney, Agent, or Firm* — Kowert, Hood, Munyon, Rankin & Goetzel, P.C.

(57) ABSTRACT

This disclosure relates to a relay user equipment device (UE) assisting one or more remote UEs in performing a radio access network notification area (RNA) update procedure in a cellular communication system. The relay UE establishes a first relay connection with a first remote device. The first relay connection relays communications between the first remote device and a network. The relay UE transmits a first message to the network to initiate the RNA update procedure for the first remote device, receives an acknowledgment message from the network including updated connection information for the first remote device, and transmits the updated connection information to the first remote device.

20 Claims, 14 Drawing Sheets

(58) Field of Classification Search
USPC .......................................................... 455/458
See application file for complete search history.

(56) References Cited

U.S. PATENT DOCUMENTS

2020/0374972 A1* 11/2020 Geng ................ H04W 12/0431
2021/0022200 A1*  1/2021 Mildh ............... H04W 52/0212
2021/0136649 A1*  5/2021 Shah .................. H04W 36/324

OTHER PUBLICATIONS

Huawei et al. "Discussion on CN location Update and RNA Update for inactive state" 3GPP TSG-RAN WG2 Adhoc#2 Meeting R2-1706736; Qingdao, China; Jun. 29, 2017.
Office Action for CN Patent Application No. 202080106525.7; Jun. 22, 2024.

* cited by examiner

| Remote UE Uu State | Relay UE Uu State | PC5-RRC Connected? | Fast RRC Connection Resumption for remote UE? |
|---|---|---|---|
| RRC_INACTIVE | RRC_CONNECTED | Yes | Yes, possible |
| RRC_INACTIVE | RRC_INACTIVE | Yes | Yes, possible |
| RRC_INACTIVE | RRC_IDLE | Yes | This scenario may not need to be supported because the latency to resume end-to-end connection is still large due to IDLE relay UE |

FIG. 10

RELAY UE-ASSISTED RAN NOTIFICATION AREA UPDATE PROCEDURE

FIELD

The present application relates to wireless communications, and more particularly to systems, apparatuses, and methods for performing a relay user equipment (UE) assisted radio access network notification area (RNA) update for one or more remote UEs in an inactive state in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionalities introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

Embodiments are presented herein of apparatuses, systems, and methods for performing a relay UE-assisted RNA update procedure for one or more remote UEs in an inactive state in a cellular communication system.

In some embodiments, a relay UE establishes a first relay connection with a first remote device. The first relay connection relays communications between the first remote device and a network. The relay UE may additionally establish a second relay connection with a second remote device, where the second connection relays communications between the second remote device and the network.

In some embodiments, the relay UE transmits a first message to the network to initiate a radio access network-based notification area (RNA) update procedure for the first remote device and/or for the second remote device. The relay UE may receive an acknowledgment message from the network including updated connection information for the first remote device and/or the second remote device. The relay UE may transmit the updated connection information to the first and/or second remote devices.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 10 is a table illustrating various combinations of radio resource control (RRC) connection statuses for a remote UE and a relay UE, according to various embodiments;

Figure 1:
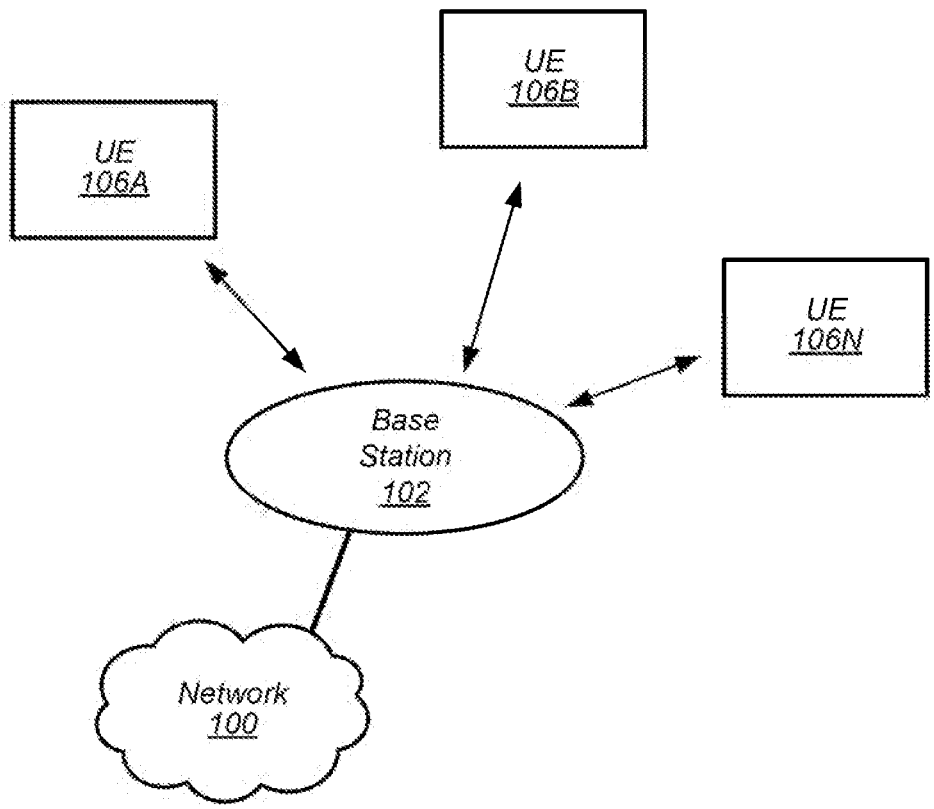
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
RAN: Radio Access Network
RNA: RAN Notification Area
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage: registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
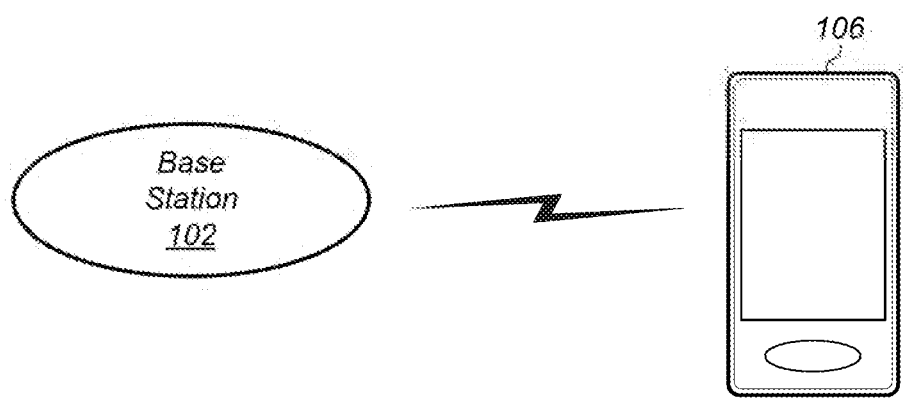
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 100 might be configured to communicate using either or both of a 3GPP cellular communication standard or a 3GPP2 cellular communication standard. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

In some embodiments, the UE 106 may be configured to perform data communication while operating in an RRC inactive state, at least according to the various methods as described herein.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuitry, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000) 1×RTT (or LTE or NR, or LTE or GSM), and separate radios for communicating using each of Wi-Fi and BLUETOOTH™. Other configurations are also possible.

Figure 3:
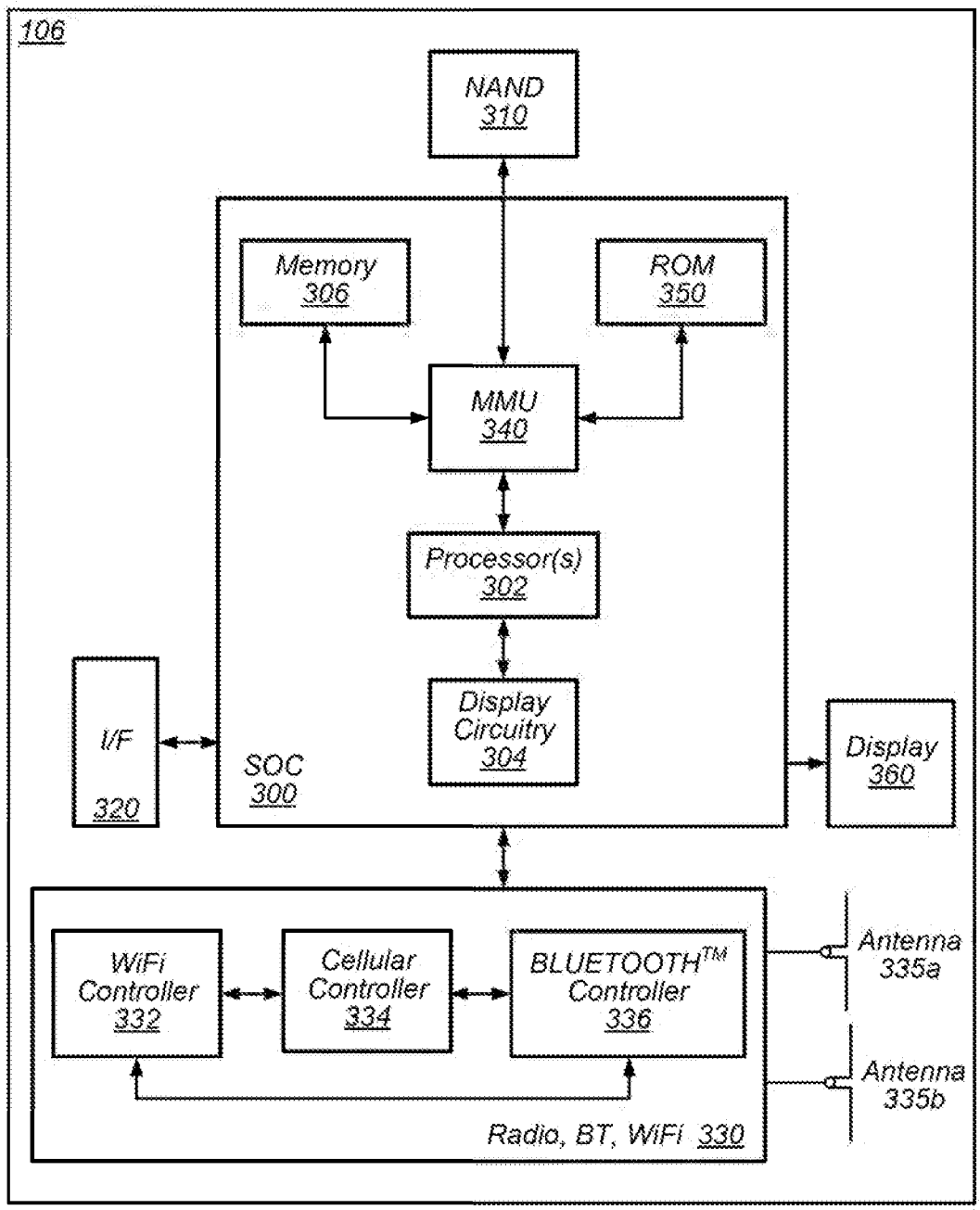
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 30). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to serve as a relay UE between one or more remote UEs and the network, and to assist in RAN-based notification area (RNA) update procedures for the remote UE(s) in a cellular communication system. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to assist one or more remote UEs in performing RNA update procedures in a cellular communication system according to various embodiments disclosed herein. Processor(s) 302 may also implement various other applications and/or end-user applications running on UE 106.

Figure 4:
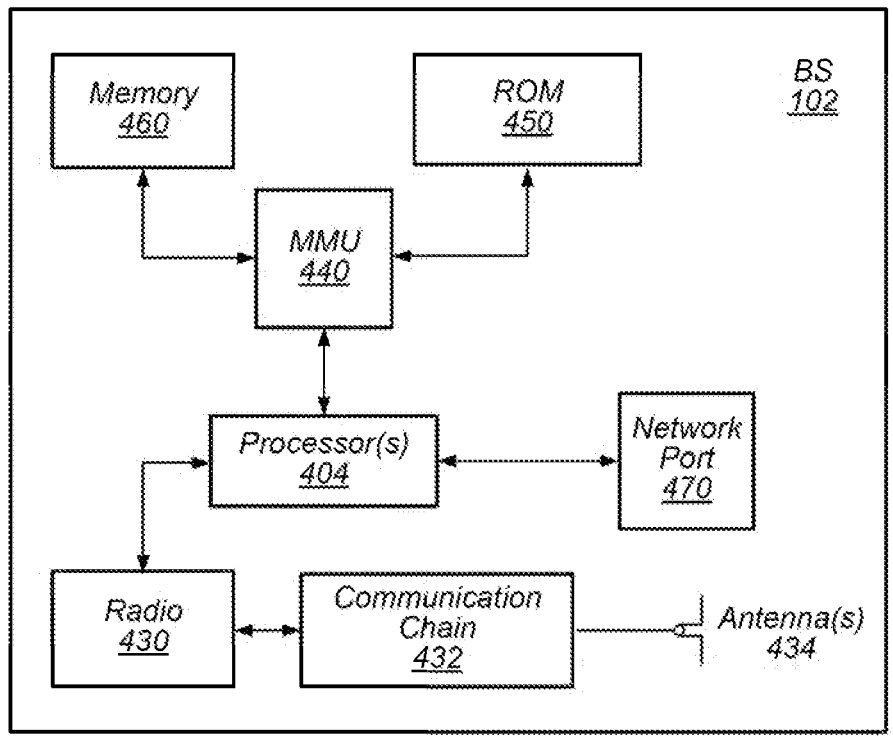
FIG. 4 illustrates an exemplary block diagram of a base station, according to some embodiments.

In some embodiments, radio 330 may include separate controllers dedicated to controlling communications for various respective RAT standards. For example, as shown in FIG. 3, radio 330 may include a Wi-Fi controller 332, a cellular controller (e.g. NR controller) 334, and BLUETOOTH™ controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH™ controller 336 may communicate with cellular controller 334 over a cell-ISM link, etc. While three separate controllers are illustrated within radio 330, other embodiments have fewer or more similar controllers for various different RATs that may be implemented in UE device 106.

FIG. 4—Block Diagram of an Exemplar Base Station FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform data communication while in an inactive state in a cellular communication system.

5G NR—RRC Inactive State

Multiple cellular communication technologies include the use of a radio resource control (RRC) protocol, e.g., which may facilitate connection establishment and release, radio bearer establishment, reconfiguration, and release, and/or various other possible signaling functions supporting the air interface between a wireless device and a cellular base station.

A wireless device may commonly operate in one of multiple possible states with respect to RRC. For example, in LTE, a wireless device may operate in an RRC connected state (e.g., in which the wireless device can perform continuous data transfer, and in which handover between cells is managed by the network and access stratum context information is retained for the wireless device), or in an RRC idle state (e.g., in which the wireless device may operate in a more battery efficient state when not performing continuous data transfer, in which the wireless device may handle it's cell re-selection activities, and in which the network may not retain access stratum context information for the wireless device).

In addition to RRC connected and RRC idle states, it may also be possible to support one or more other types of RRC states for a wireless device, at least according to some embodiments. For example, for 5G NR, an RRC inactive state in which a wireless device may be able to operate in a relatively battery efficient state while the network also retains at least some access stratum (AS) context information may be supported. At least according to some embodiments, such a state may employ wireless device-based mobility, e.g., such that a wireless device can move within a radio access network notification area (RNA) without notifying the radio access network (RAN). While in this state, a wireless device may perform cell re-selection and system information acquisition for itself. At the same time, the last serving base station (e.g., gNB) may keep the wireless device context and the NR connection with the 5G core network (CN) associated with the wireless device, e.g., to facilitate an easier transition back to an RRC connected state. When paging a wireless device in the RRC inactive state, RNA-specific parameters may be used by the RAN, for example including a UE-specific DRX and a UE Identity Index value (e.g., I-RNTI).

A wireless device operating in such an RRC inactive state may perform RNA updates periodically (e.g., based on a configured periodic RNA update timer) and/or in an event based manner, e.g., when the wireless device moves out of its current configured RNA to a different RNA, according to various embodiments. Exemplary embodiments herein describe methods and devices for a relay UE to assist one or more remote UEs in performing RNA update procedures.

Use of an RRC inactive state may help reduce the network signaling overhead for a wireless device's connection, at least in some instances. For example, for a wireless device with infrequent data transmissions, utilizing such an RRC inactive state may reduce the amount of mobility related signaling (e.g., for handovers) needed compared to an RRC connected state, e.g., since the wireless device may be able to manage its own cell re-selection process when moving between cells. For such a wireless device, utilizing an RRC inactive state may also jo reduce the amount of connection setup related signaling needed compared to an RRC idle state, e.g., since the network may retain at least some context information for the wireless device. This may directly reduce the signaling latency associated with a transition to an RRC connected state.

As another potential benefit, such a state may reduce the control plane delay for a wireless device, e.g., in comparison to operating in an RRC idle state. For example, a reduced access stratum connection setup period and/or non-access stratum connection setup period may be possible for an RRC inactive state relative to an RRC idle state. The time to move from a battery efficient state to the start of continuous data transfer may thus be reduced.

Additionally, such a state may improve the power saving capability of a wireless device, e.g., in comparison to operating in an RRC connected state. For example, while in RRC connected state, serving and/or neighboring cell measurements may be required more frequently than while in RRC inactive state, e.g., at least in line with a connected state discontinuous reception (C-DRX) period of the wireless device.

Figure 5:
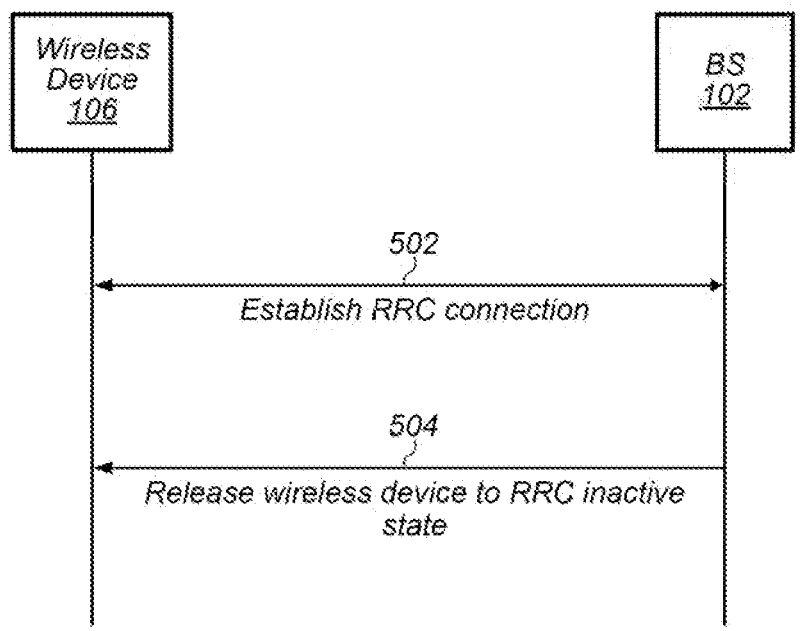
FIG. 5 is a communication flow diagram illustrating a method for transitioning from a connected to an inactive state in a cellular communication system, according to some embodiments.

FIG. 5 is a communication flow diagram illustrating a method for a UE to establish an RRC connection and transition to an RRC inactive state. In 502, the wireless device and the cellular base station may establish a RRC connection. For example, the wireless device may attach to a cell provided by the cellular base station. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station, at least according to some embodiments. After establishing the RRC connection, the wireless device may operate in an RRC connected state. While in the RRC connected state, the wireless device may undergo handover from one serving cell (e.g., provided by a cellular base station) to another serving cell (e.g., provided by a different cellular base station), at least in some embodiments.

In 504, the wireless device may transition from the RRC connected state to the RRC inactive state. Transitioning from the RRC connected state to the RRC inactive state may include the wireless device receiving an indication releasing or deactivating the RRC connection, and/or otherwise determining that a trigger has occurred to release or deactivate the RRC connection. Based at least in part on the indication (and/or other trigger), the wireless device may transition from the RRC connected state to an RRC inactive state. The indication may be received from a cellular base station (e.g., the base station with which the RRC connection was established, or possibly a different cellular base station if handover has occurred one or more times). While in the RRC inactive state, the wireless device may be paged by the cells of the current RNA if the network has data for the wireless device based on the wireless device's association with the current RNA.

The RRC inactive state is an operating mode supported in 5G NR, which may reduce signaling overhead and power consumption for a UE relative to the RRC connected state while improving the UE access latency relative to the RRC idle state. For example, for a UE with infrequent data transmissions, operating in the RRC inactive state may reduce the mobility related signaling relative to operating in the RRC connected state (e.g., handovers may be avoided), and operating in the RRC inactive state may reduce the connection setup related signaling relative to operating in the RRC idle state. The time to move from a battery efficient state to the start of continuous data transfer (e.g., the control plane delay) may also be reduced. For example, a UE in the RRC inactive state may reduce the control plane delays due to access stratum connection setup and non-access stratum connection setup periods relative to a UE in the RRC idle state. Power consumption may be reduced relative to operation in the RRC connected state, e.g., as measurements can be performed less frequently (e.g., in the RRC connected state, it may be the case that measurements must meet the connected state measurement requirements based on the connected state discontinuous reception (C-DRX) period).

At least according to some embodiments, transitions between RRC inactive and connected states may be performed without impacting the core network. The UE and the RAN (e.g., the last serving gNB of the UE) may store the UE access stratum context while a UE is in the RRC inactive state. Mobility in the RRC inactive state may be handled in a UE centric manner, e.g., similar to RRC idle state, with cell re-selection being performed by the UE. Such mobility activities and the precise RRC state of a UE may be hidden to the core network. State changes from RRC inactive state to RRC connected state and vice versa may be possible, as well as changes from RRC inactive state to RRC idle state. Note that transitions from the RRC idle state to the RRC inactive state may not be supported, at least in some instances.

Similar to the core network tracking area concept used to support UE mobility in idle state, inactive state may use a RAN notification area (RNA), which may be configured by the gNB on a per UE basis. A UE may be reachable within its configured RNA via a RAN-initiated paging (e.g., according to a UE specific DRX cycle) using a RAN configured UE ID (1-RNTI), e.g., by all gNBs within the RNA. RNA updates may be triggered periodically (e.g., based on a configured periodic RNA update timer) and when moving outside of the configured RNA.

Figure 6:
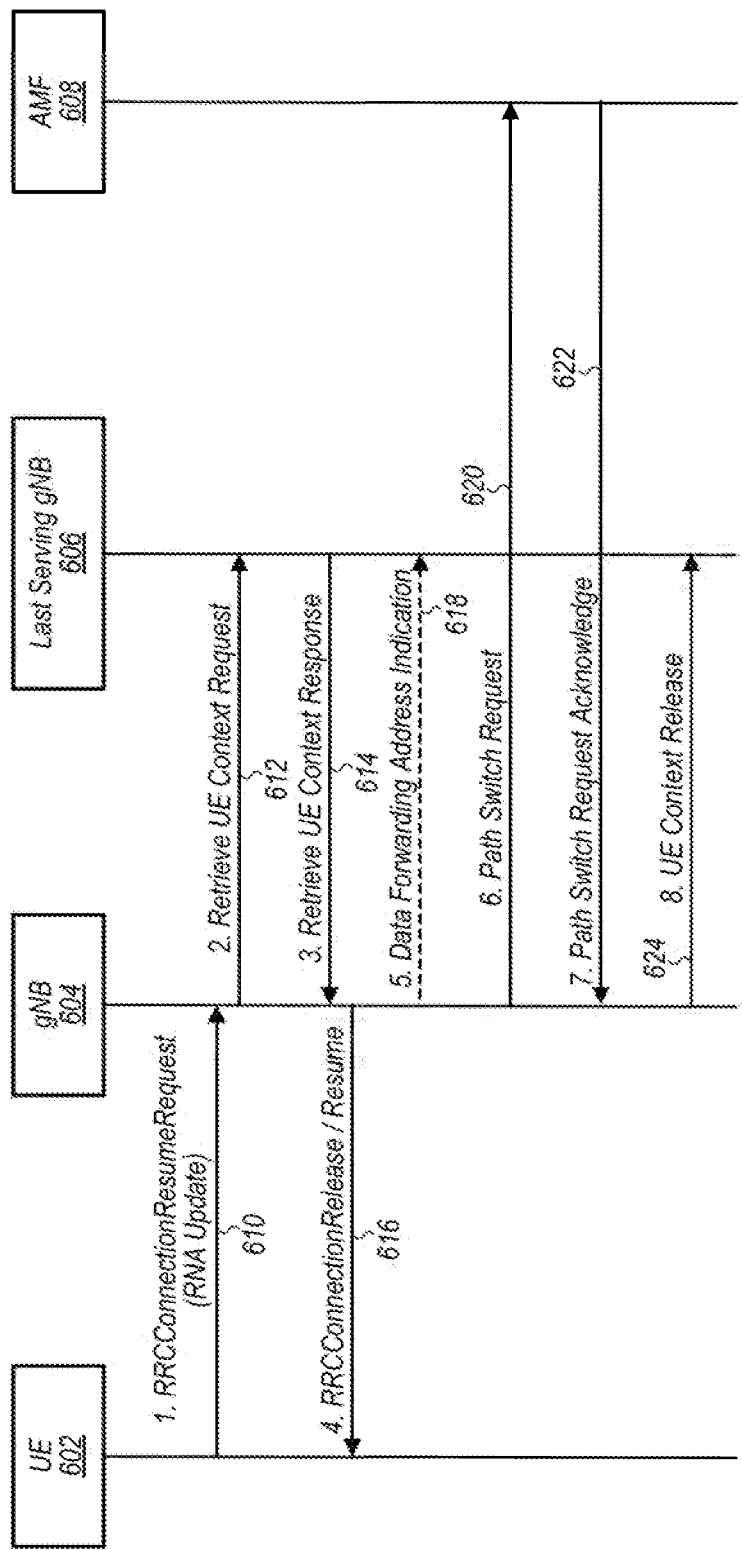
FIG. 6 is a communication flow diagram illustrating aspects of an exemplary possible model for an inactive state in a cellular communication system, according to some embodiments.

FIG. 6 is a communication flow diagram illustrating possible signaling flow for performing an RNA update procedure while in an RRC inactive state. As shown, in 610 a UE 602 may provide a RRCConnectionResumeRequest (e.g., with an indication to perform a RNA update) to its current serving gNB 604. In 612, the current serving gNB 604 may provide a retrieve UE context request to the last serving gNB 600. In 614, the last serving gNB 606 may provide a retrieve UE context response to the current serving gNB 604. In 616, the current serving gNB 604 may provide a RRCConnectionRelease/Resume message to the UE 602. In 618, the current serving gNB 604 may also provide a data forwarding address indication to the 1s last serving gNB 606. In 620, the current serving gNB 604 may further provide a path switch request to an AMF 608 (e.g., an AMF serving the RNA). In 622, the AMF 608 may provide a path switch request acknowledge to the current serving gNB 604. In 624, the current serving gNB 604 may provide a UE context release message to the last serving gNB 606.

UE-to-NW Relay

In some embodiments, a UE such as UE 106A-N may serve as a relay UE to relay communications between a remote UE and the network (NW). As one example, the relay UE may be a smartphone and the remote UE may be an accessory or wearable device that utilizes a relay connection with the smartphone to access a cellular network. Alternatively, each of the remote and relay devices may be any of a variety of types of UE devices, in various embodiments. The term "relay UE" is intended herein to refer not to a specific type of UE device, but is rather a functional description that the relay UE is serving as a relay between a remote UE and the NW. Similarly, "remote UE" is a functional term used to refer to a UE device that is utilizing a sidelink connection with a relay UE to communicate with the NW.

Figure 9:
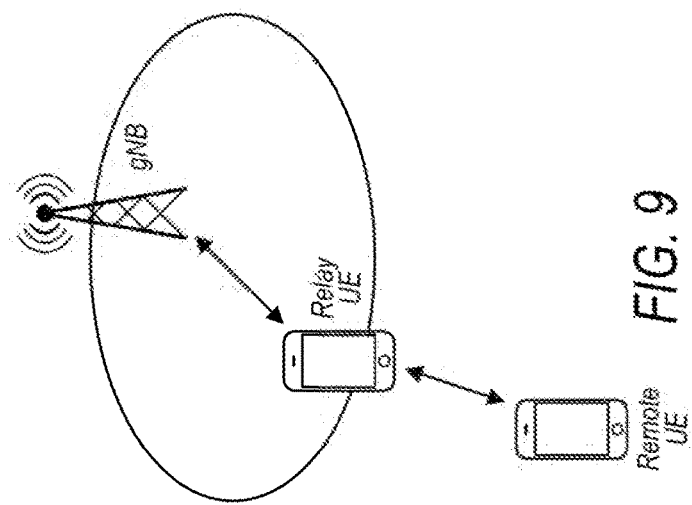
FIG. 9 illustrates a deployment scenario for a UE-to-NW relay, according to some embodiments.
Figure 7:
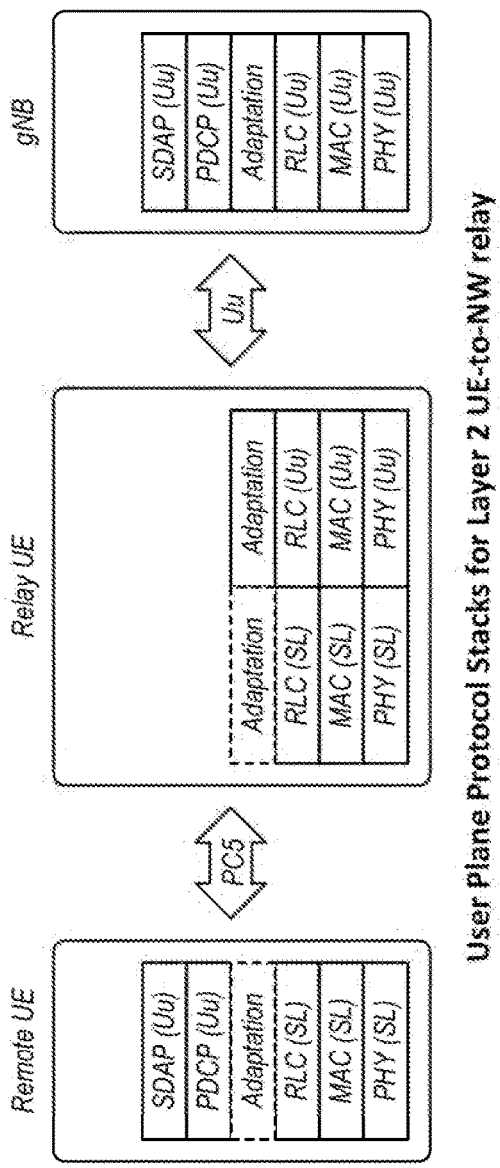
FIG. 7 illustrates user plane protocol stacks for a layer 2 UE-to-NW relay, according to some embodiments.
Figure 8:
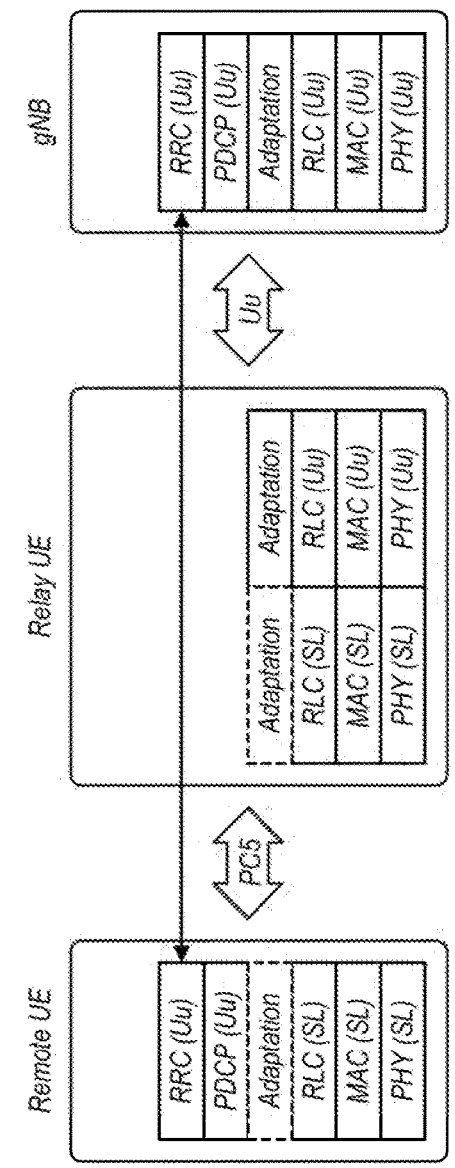
FIG. 8 illustrates control plane protocol stacks for a layer 2 UE-to-NW relay, according to some embodiments.

Typically, relaying is performed above the radio link control (RLC) sublayer for protocol architectures for the user plane and control plane. For example, FIGS. 7 and 8 illustrate user plane and control plane protocol stacks, respectively, for a layer 2 UE-to-NW relay. As illustrated, the Uu PDCP and RRC are terminated between the evolved ProSe Remote UE and the gNB, while the RLC, MAC and PHY are terminated in each link. FIG. 9 illustrates a deployment scenario where a relay UE is within communicable range of a gNB, and serves as a relay for communications between a remote UE (which is not in communicable range of the gNB, but is in communicable range of the relay UE) and the gNB.

In some embodiments, a UE-to-NW relay may be implemented in a 5G NR communication environment, where one or both of the remote UE and the relay UE operates in the RRC inactive state. Embodiments herein present communication enhancements to improve the effectiveness and/or efficiency of the UE-to-NW relay communications in these environments. For example, it may be desirable to quickly resume an RRC connection for a remote UE operating in the RRC inactive state.

FIG. 10 is a table summarizing various scenarios where one or both of the remote and w relay UEs are operating in the RRC inactive state. For example, the remote UE may be operating in the RRC inactive state while the relay UE is operating in either the RRC connected, inactive or idle states. While the remote UE is in the RRC inactive state and the relay UE is in the RRC connected or inactive state, embodiments herein present methods to implement a fast RRC connection resumption for the remote UE, e.g., by utilizing the relay UE to assist in an RNA update procedure for the remote UE. Conversely, when the remote UE is in the RRC inactive state and the relay UE is in the RRC idle state, it may not be desirable to implement the methods described herein, as the latency to resume an end-to-end connection with the remote UE may be large due to the latency involved in communications from the idle relay UE. In exemplary embodiments, methods for the relay UE to assist the remote UE in RNA updates may be performed once the PC5 link between the remote UE and the relay UE has already been established. For example, if the remote UE is not connected to a relay UE, it may not be reachable by the gNB to implement embodiments described herein.

In 5G NR, a UE in an RRC inactive state maintains its UE inactive access stratum (AS) context. Generally speaking, the UE AS context may be divided into an upper layer and a lower layer. The upper layer includes the bearer configuration, such as the signaling radio bearer 1 (SRB1), signaling radio bearer 2 (SRB2), data radio bearer 1 (DRB1), etc. and related security configurations. The lower layer includes the master cell group (MCG) configuration (including MCG SCells) and the multi-RAT dual connectivity (MR-DC) related configuration (including secondary cell group (SCG) related information). When a relay UE resumes an RRC connection (i.e., when it transitions from RRC inactive to RRC connected), it may be desirable for it to resume its forwarding relay function quickly. To address these and other concerns, in some embodiments additional relay information may be added to the UE inactive AS context, which is stored by both the relay UE and the NW. For example, the UE inactive AS context may store the association between the relay UE and one or more remote UEs for which the relay UE is providing a relay. Additionally or alternatively, bearer mapping in the adaptation layer may be stored in the UE inactive AS context, that specifies which end-to-end Uu bearer (in the PDCP layer) maps into the Uu bearer between the relay UE and the gNB.

Figure 11:
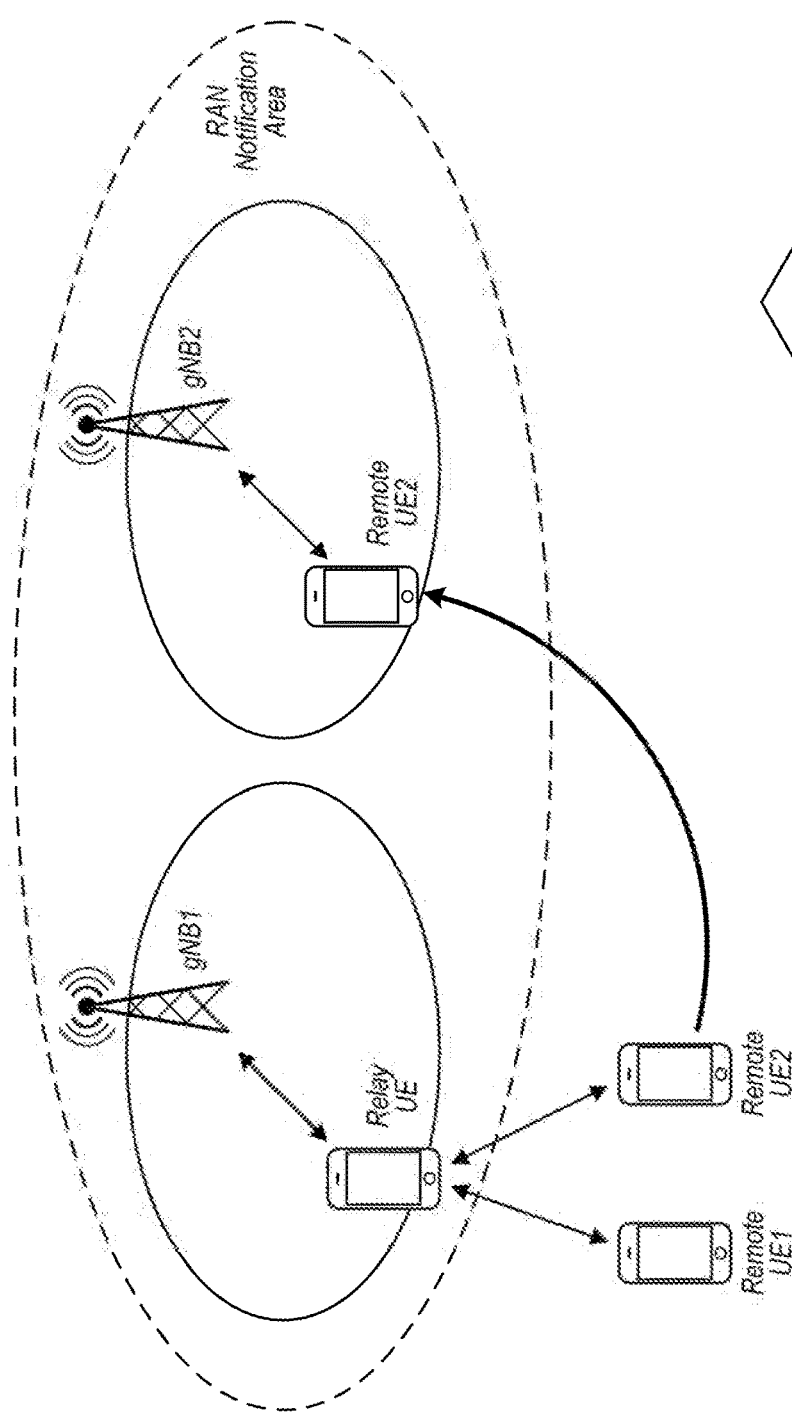
FIG. 11 illustrates a deployment scenario where a remote UE in a UE-to-NW relay moves into direct coverage of a gNB.

FIG. 11 illustrates a deployment scenario where a relay UE is connected to a first gNB (gNB1) and a first and second remote UE (remote UE1 and remote UE2). The remote UE2 is reachable via RAN paging for the RAN notification area via the relay UE. If the remote UE 2 moves into range of a second gNB (gNB2), it may continue receiving RAN paging for the RAN notification area directly from the gNB2.

A remote UE operating in an RRC idle or inactive mode may trigger tracking area updates (TAUs) and RNA updates, similar to a UE that is directly connected to the network. For example, a remote UE in the RRC inactive state may perform RAN paging, RRC Resume and RNA update procedures. If a remote UE is not connected to a relay UE, it may need to first select/connect to a relay UE in order to conduct these procedures. The TAU procedure is in the non-access stratum (NAS) layer where the role of an "L2 relay" may be invisible. For example, the L2 relay may not be known to the AMF and may be transparent in the NAS layer.

As opposed to the NAS, usage of a L2 relay may be known to the gNB and may not be transparent in the RRC layer. The RNA may be used for RAN paging. If a gNB belongs to one RNA, then all the sidelink (SL) relays which camped in this gNB may also be responsible for conducting RAN paging via the relay UE to its connected remote UEs.

Figure 12:
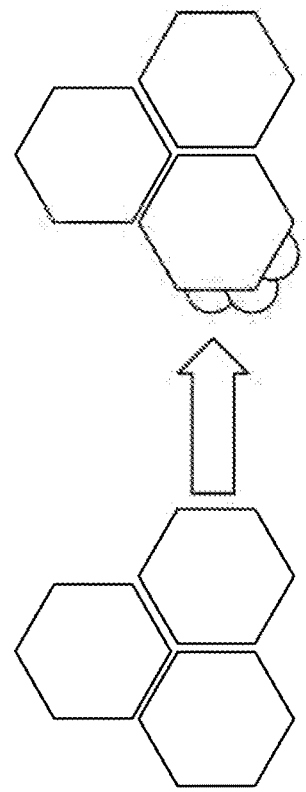
FIG. 12 illustrates how a UE-to-NW relay may increase the coverage area of a RNA, according to some embodiments.

FIG. 12 illustrates how relay UEs may be utilized to extend the coverage area of a RNA, by utilizing the communicable range of relay UEs along the perimeter of the RNA. In some embodiments, the relay UEs may be used to assist remote UEs in triggering and/or performing RNA update procedures as part of an RRC resume procedure to transition from RRC inactive to RRC connected. In some embodiments, an RNA update procedure may be triggered if a remote UE and a relay UE have an active PC5-RRC connection, a T380 timer expires, and the remote UE detects that it has moved out of the configured RN, as described in greater detail below. Additionally or alternatively, an RRC resume procedure may be triggered by the upper layer for other reasons.

When a remote UE is connected to a gNB via a relay UE, the RNA is typically set to be the same as for the relay UE, and a t380 may be assigned to the remote UE for triggering an RNA update procedure. The remote UE may utilize a sidelink (SL) connection with the relay UE during mobility scenarios to determine its behavior regarding RNA update procedures. For example, the relay UE moves away from (i.e., out of range of) the remote UE and the remote UE does not find a new relay UE, it will be out-of-coverage (OOC) and may not be able to update its RNA. Accordingly, the NW may release the remote UE to an RRC idle state after the T380 timer expires. Alternatively, when the remote UE loses its connection with a first relay UE and discovers a new relay UE, it may perform communications to figure out whether the new relay UE belongs to the same RNA as the first relay UE. If the new relay UE is in the same RNA and the T380 timer of the remote UE has not expired, there may be no need to perform an RNA update procedure. As another example, in a group mobility scenario (i.e., when the relay UE and the remote UE move concurrently, e.g., if they are both carried by a single user or vehicle), the relay UE may inform the remote UE when the relay UE experiences an RNA change, so the remote UE may trigger an RNA update.

In some embodiments, methods may be used for the remote UE to obtain RNA information from the relay UE. As a first option, the relay UE may broadcast a system information block 1 (SIB1) that the relay UE receives from the gNB, which indicates the RNA to which the relay UE is connected. A remote LIE, in deciding which of two or more available relay UEs to utilize for relay communications, may consider the RNA broadcast by the SIB1 (e.g., the remote UE may preferentially select a relay UE connected to the same or a different RNA as the remote UE). As a second option, the relay UE may not broadcast RNA information, but may directly transmit RNA information to a remote UE after establishing a relay connection with the remote UE. In some embodiments, when a remote UE is required to do an RNA update, it may first check whether it is connected to a relay.

Figure 13:
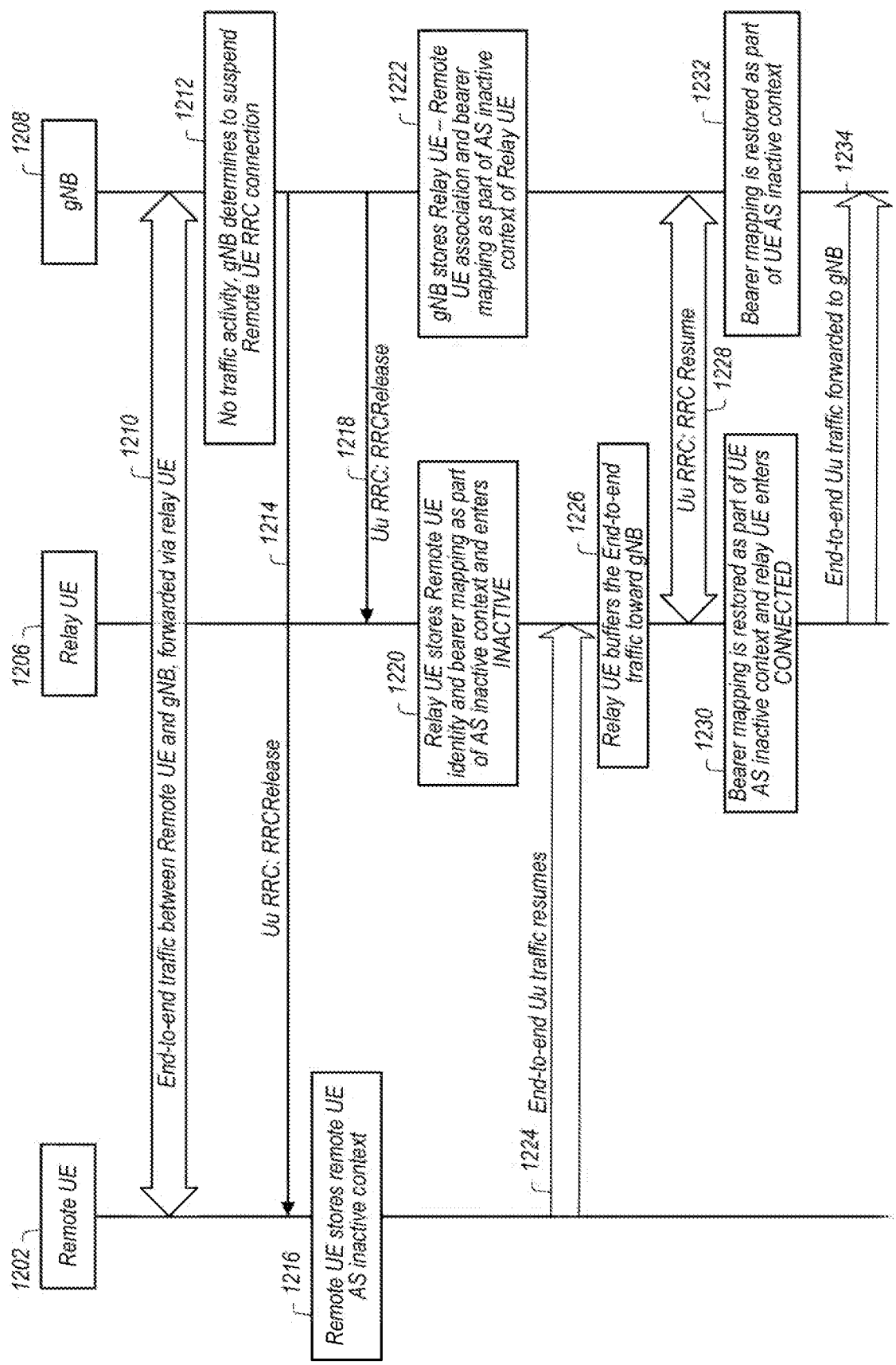
FIG. 13 is a communication flow diagram illustrating a method for a relay UE and a remote UE to enter an RRC inactive state and resume their connection with the network, according to some embodiments.

FIG. 13 is a communication flow diagram illustrating a method for a relay UE 1206 and a remote UE 1202 to enter an RRC inactive state and resume their connection with a gNB 1208, according to some embodiments. As illustrated, at 1210, a relay connection is established and end-to-end traffic is communicated between the remote UE and the gNB using the relay UE as a relay for forwarding uplink and downlink communications. At 1212, the gNB determines that the remote UE has not had any traffic activity for a predetermined period of time, and determines to suspend the remote UE's RRC connection. To accomplish this, at 1214 the gNB transmits an RRCRelease message to the remote UE via the relay UE. Upon reception of the RRCRelease message, at 1216 the remote UE stores its access stratum (AS) inactive context, and enters the RRC inactive state. Further, at 1218, the gNB transmits a second RRCRelease message to the relay UE to cause the relay UE to suspend the relay connection and enter the RRC inactive state. At 1220, the relay UE stores configuration information related to the relay connection as part of a UE inactive access stratum (AS) context. In some embodiments, the configuration information comprises the remote UE's identity and bearer mapping as part of the AS inactive context. For example, the configuration information may specify a bearer mapping configuration in an adaptation layer, wherein the bearer mapping configuration specifies an end-to-end Uu bearer in a packet data convergence protocol (PDCP) layer to map to a Uu bearer operating between the relay UE and the network. At 1222, the gNB stores the relay UE/remote UE association and the bearer mapping as part of the AS inactive context of the relay UE.

At 1224, end-to-end Uu traffic resumes by the remote UE, and the remote UE transmits traffic to the relay UE to resume the relay connection and forward the traffic to the gNB. For example, those traffic can be either a new end-to-end Uu RRC message to allow UE to resume the RRC_CONNECTED state, or an RNA (RAN Notification Area) update message, or any other control plane or user plane traffic generated by AS (Access stratum) layer or upper layer(s) of the remote UE. At 1226, the relay UE buffers the end-to-end traffic received from the remote UE, since the relay UE is currently in the RRC inactive state. At 1228, the relay UE exchanges 1o RRC Resume signaling with the gNB to re-enter the RRC connected state and resume the suspended RRC connection between relay UE and gNB. The relay UE may restore the configuration information of the UE inactive AS context when resuming the relay connection. For example, at 1230, the bearer mapping is restored as part of the UE AS inactive context, and the relay UE enters the RRC connected state. At 1232, the gNB also restores the bearer mapping 13 as part of the UE AS inactive context. Finally, at 1234, the relay UE forwards the end-to-end traffic received from the remote UE to the gNB.

Figure 14:
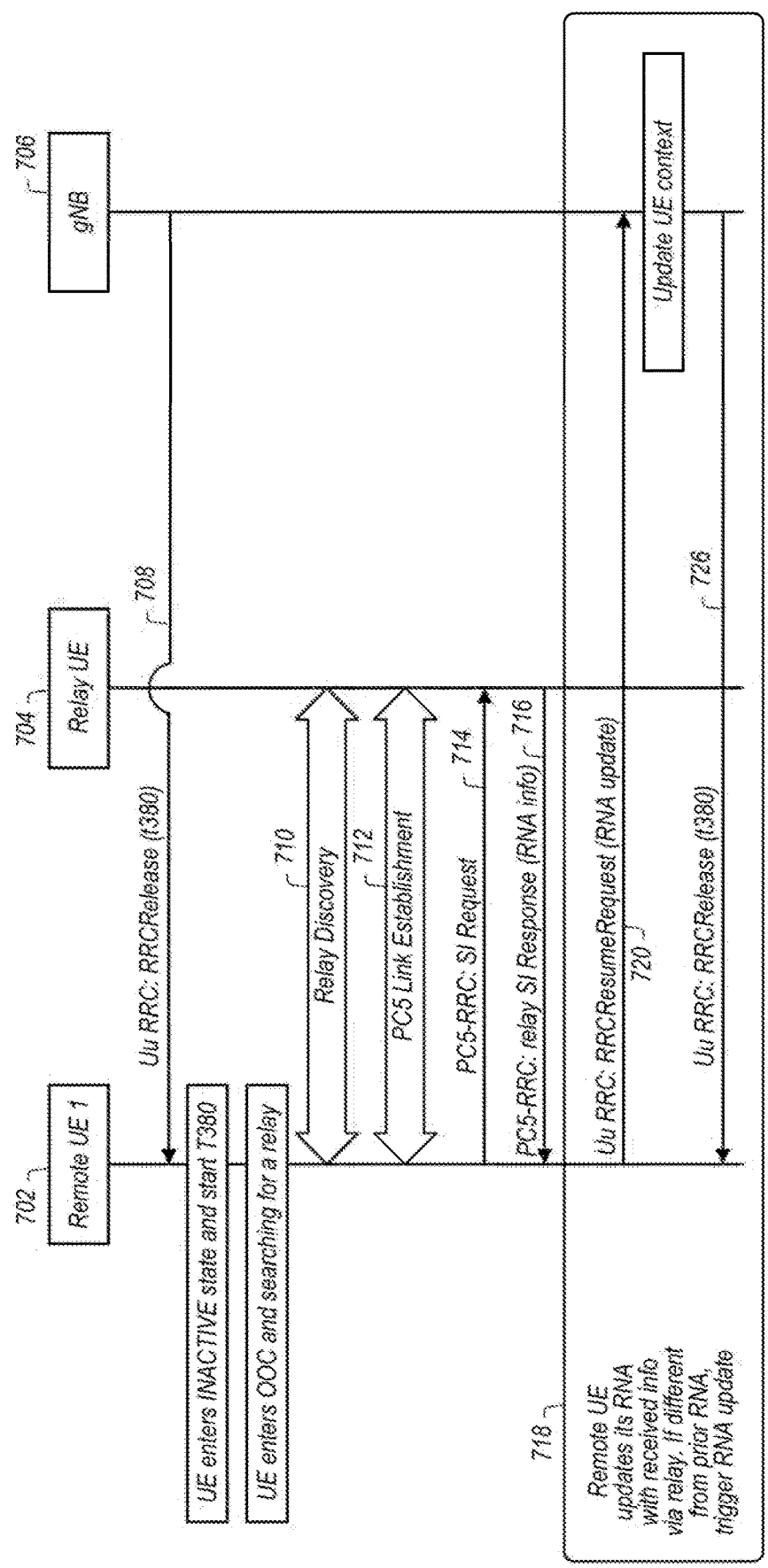
FIG. 14 is a communication flow diagram illustrating a method for a relay UE in an RRC connected state to assist a remote UE in an RNA update procedure, according to some embodiments.

FIG. 14 is a communication flow diagram illustrating a method for a relay UE 704 to assist a remote UE 702 in performing an RNA update procedure with a gNB 706 while the relay UE is in RRC connected mode. As illustrated, at 708 the gNB transmits an RRCRelease message to the remote UE, whereupon the remote UE enters the RRC inactive state and starts a T380 timer. Note that the RRCRelease message is transmitted directly to the remote UE, without relaying through the relay UE. Subsequently, the remote UE enters OOC and searches for a relay UE to reconnect to the network. The remote UE and the relay UE perform relay discovery 710, PC5 link establishment 712, and the remote UE transmits a system information (SI) request to the relay UE at step 714, and the relay UE responds with a relay SI response including RNA information at step 716. After establishing the relay connection between the remote UE and the relay UE, the remote UE updates its RNA with information received from the relay UE. If the RNA of the relay UE is different from the remote UE's previous RNA, the remote UE may trigger an RNA update. The remote UE transmits an RRCResumeRequest message to the gNB via the relay UE at step 720. In response, the gNB updates the remote UE context and transmits an RRCRelease to the remote UE to restart its T380 timer at step 726.

Figure 15:
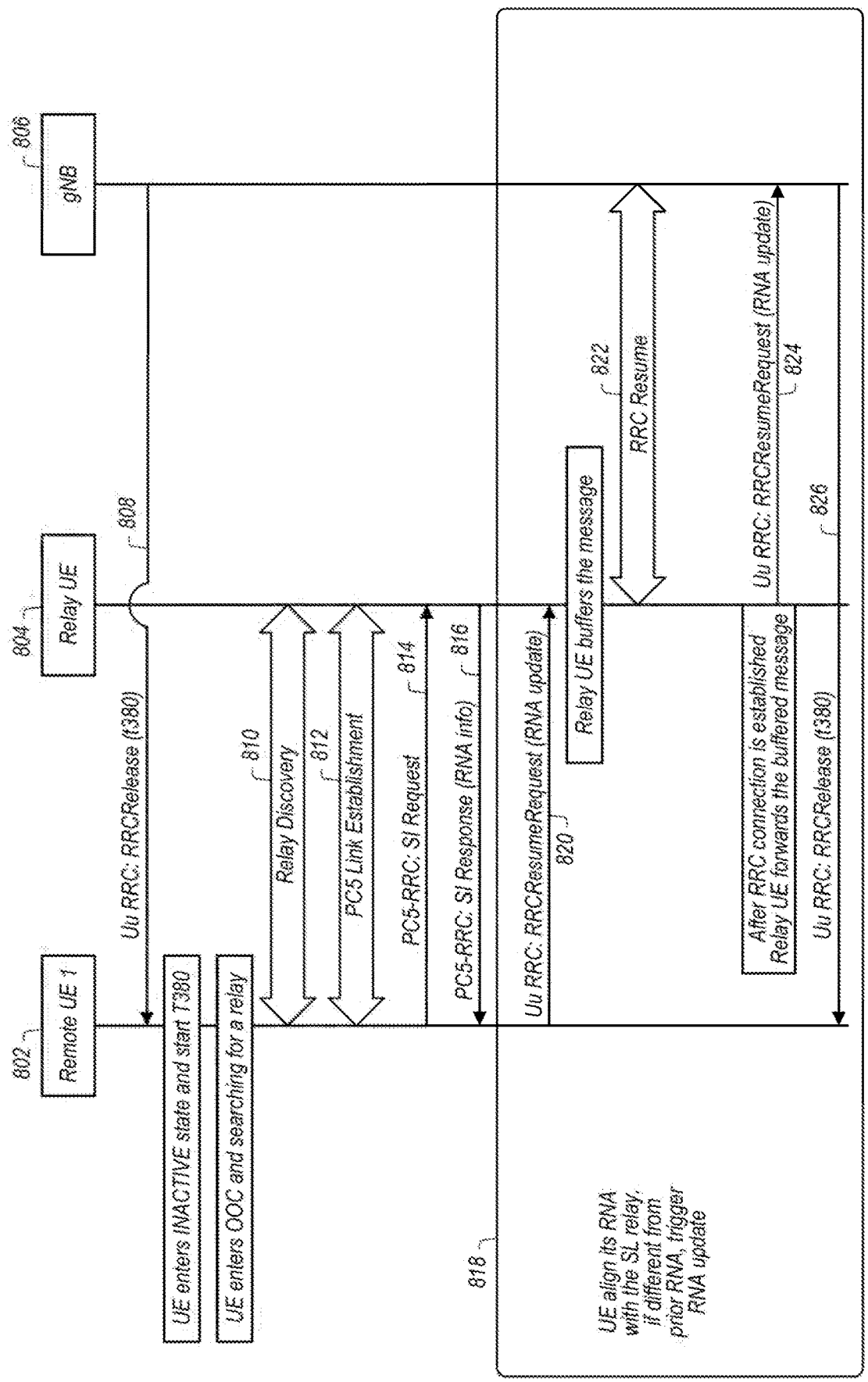
FIG. 15 is a communication flow diagram illustrating a method for a relay UE in an RRC inactive state to assist a remote UE in an RNA update procedure, according to some embodiments.

FIG. 15 is a communication flow diagram illustrating a method for a relay UE 804 to assist a remote UE 802 in performing an RNA update procedure with a gNB 806 while the relay UE is in RRC inactive mode. The method shown in FIG. 15 is similar in some respects to the method shown in FIG. 14. For example, at 808 the gNB transmits an RRCRelease message to the remote UE, whereupon the remote UE enters the RRC inactive state and starts a T380 timer. Note that the RRCRelease message is transmitted directly to the remote UE, without relaying through the relay UE. Subsequently, the remote UE enters OOC and searches for a relay UE to reconnect to the network. The remote UE and the relay UE perform relay discovery 810, PC5 link establishment 812, and the remote UE transmits a system information (SI) request to the relay UE at step 814, and the relay UE responds with a relay SI response including RNA information at step 816. After establishing the relay connection between the remote UE and the relay UE, the remote UE aligns its RNA with the RNA of the relay UE. If the RNA of the relay UE is different from the remote UE's previous RNA, the remote UE may trigger an RNA update. The remote UE transmits an RRCResumeRequest message to the relay UE at 820. The relay UE buffers the RRCResumeRequest message. The relay UE and the gNB exchange RRCResume messaging at 822. After the RRC connection is established between the relay UE and the gNB, the relay UE forwards the buffered RRCResumeRequest message to the gNB at step 824. Finally, the gNB responds to the remote UE, via the relay UE, with an RRCRelease message 1s instructing the remote UE to restart its T380 timer at step 826.

In some embodiments, a single relay UE may be connected to multiple remote UEs. If the relay UE is not in an RRC connected state, there may be significant overhead for the relay UE if each remote UE triggers an RNA update at a different time. To address these and other concerns, in some embodiments, the relay UE may conduct RNA updates on behalf of all the remote UEs associated with the relay UE at once by reporting IDs of all these remote UEs in a single transmission. As long as a remote UE is still connected to a relay UE (e.g., via PC5-S keep alive messaging), there may be no need to trigger an RNA update at the expiry of the T380 timer.

In some embodiments, the relay UE may conduct RNA updates once for all connected remote UEs (and itself if it is in the RRC inactive state) as an aggregated update. Providing the gNB with identifiers of the remote UEs connected to the relay UE may allow the gNB to perform additional functionality for the remote UEs, such as handover procedures and scheduling, among other possibilities. Advantageously, the aggregated update procedure may reduce signaling overhead significantly.

In some embodiments, a remote UE may disconnect from its relay UE (e.g., if it moves out of range), in which case the remote UE may resume its UE-triggered RNA update procedure based on a T380 timer or an RNA area mismatch.

Figure 16:
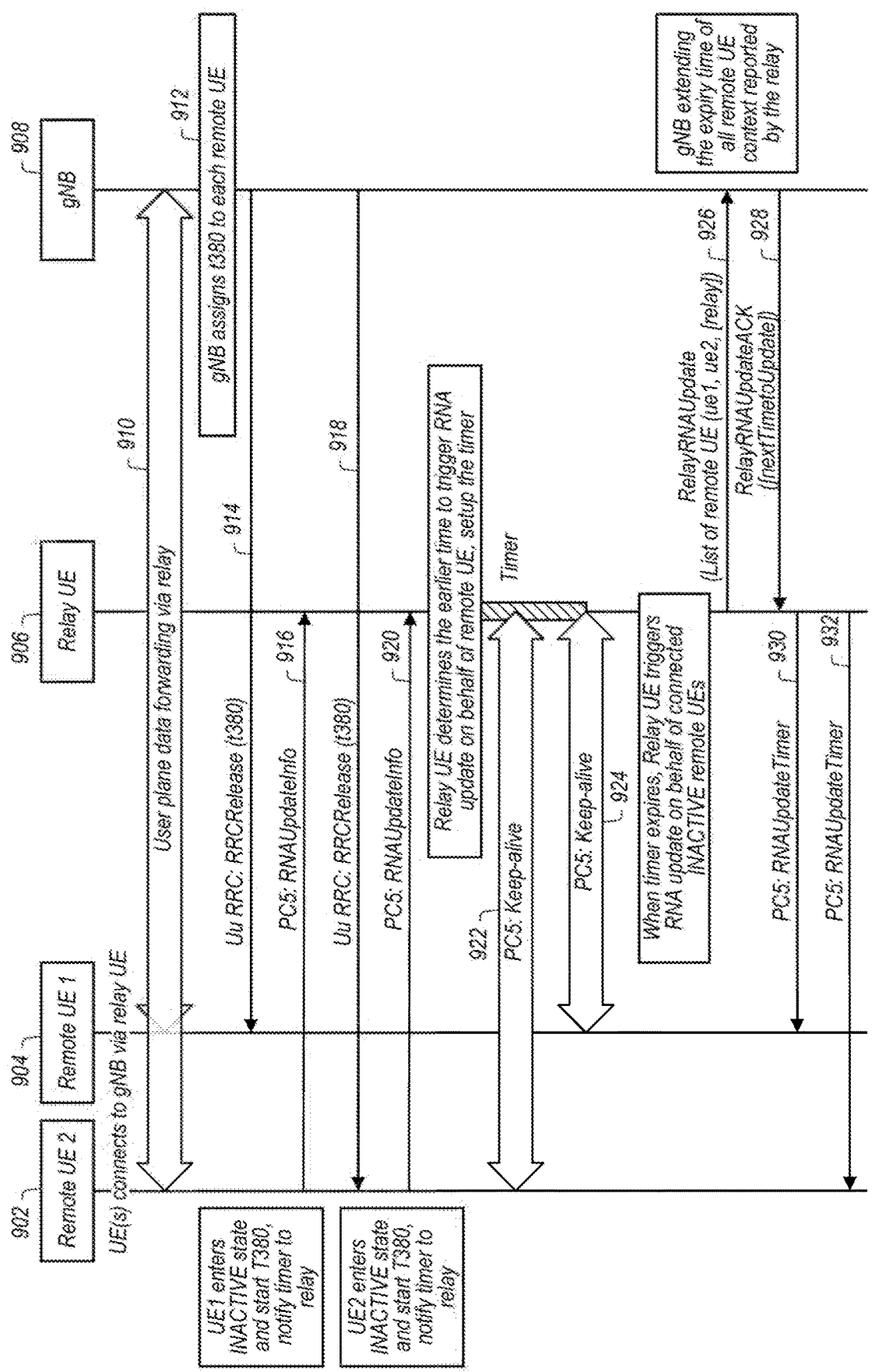
FIG. 16 is a communication flow diagram illustrating a method for a relay UE to assist multiple remote UEs in an RNA update procedure, according to some embodiments.

FIG. 16 is a communication flow diagram illustrating a method for a relay UE 906 to assist multiple remote UEs in an RNA update procedure. The method shown in FIG. 16 starts after each of remote UE1 904 and remote UE2 902 have each established a relay connection with the gNB 908 via the relay UE. At 910, user plane data is forwarded to remote UEs 1 and 2 via the relay UE. At 912, the gNB assigns a T380 timer to each of the two remote UEs. At 914, the gNB transmits an RRCRelease message to remote UE1 via the relay UE for the remote UE1 to enter the RRC inactive state and start the T380 timer. The remote UE1 may notify the relay UE of the initiation of the T380 timer with an RNAUpdateInfo message at 916. At 918, the gNB transmits an RRCRelease message to remote UE2 via the relay UE for the remote UE2 to enter the RRC inactive state and start the T380 timer. The remote UE2 may notify the relay UE of the initiation of the T380 timer with an RNAUpdateInfo message at 920.

The relay UE may determine which of the remote UEs 1 and 2 have an earlier expiration time for their respective T380 timers and may set the earlier expiring timer as an RNA timer for triggering an RNA update procedure for both remote UEs (and potentially for the relay UE as well). Before expiration of either T380 timer, the relay UE may exchange PC5 keep alive messaging with the remote UE1 924 and the remote UE2 922. The relay UE may trigger an RNA update procedure for both remote UEs based on expiration of the RNA timer. To do so, the relay UE may transmit a single RelayRNAUpdate message to the gNB at 926, where the RelayRNAUpdate message includes a list of all remote UEs being serviced by the relay UE. The RelayRNAUpdate may also specify an identifier of the relay UE, if the relay UE is in the RRC inactive state and also wishes to perform an RNA update procedure. The gNB may extend the expiry time of all remote UE contexts (and potentially of the relay UE as well) based on the RelayRNAUpdate message received from the relay UE. At 928, the gNB responds to the relay UE with a RelayRNAUpdateACK message that specifies a subsequent time for performing a next RNA update procedure. At 930 and 932, the relay UE may transmit an RNAUpdateTimer message via the PC5 interface to the remote UE 1 and 2, respectively, to inform the remote UEs of the updated timing for the subsequent RNA update procedure.

Suppressed RNA Updates for Remote UEs

In some embodiments, rather than having the remote UEs monitor their own T380 timers for initiating RNA update procedures, the relay UE may receive T380 timer information directly from the network. For example, when a gNB releases a remote UE to the RRC inactive state via a LE-to-NW relay, the gNB may indicate for the remote UE to suppress the RAN update procedure (e.g., by auto-renewing its T380 timer). In these embodiments, the timing for performing the RAN update procedure may be determined by the relay UE, which may proceed differently depending on whether the relay UE is in the RRC connected or inactive state. When the relay UE is in the RRC inactive state, the gNB may configure an RNA update timer with the relay UE when the relay UE is put into the RRC inactive state with a RRCRelease message. The relay UE may automatically include its list of remote UEs in the relay UE's RRCResumeRequest message to the gNB when the RNA update timer expires, triggering its RNA update.

Figure 17:
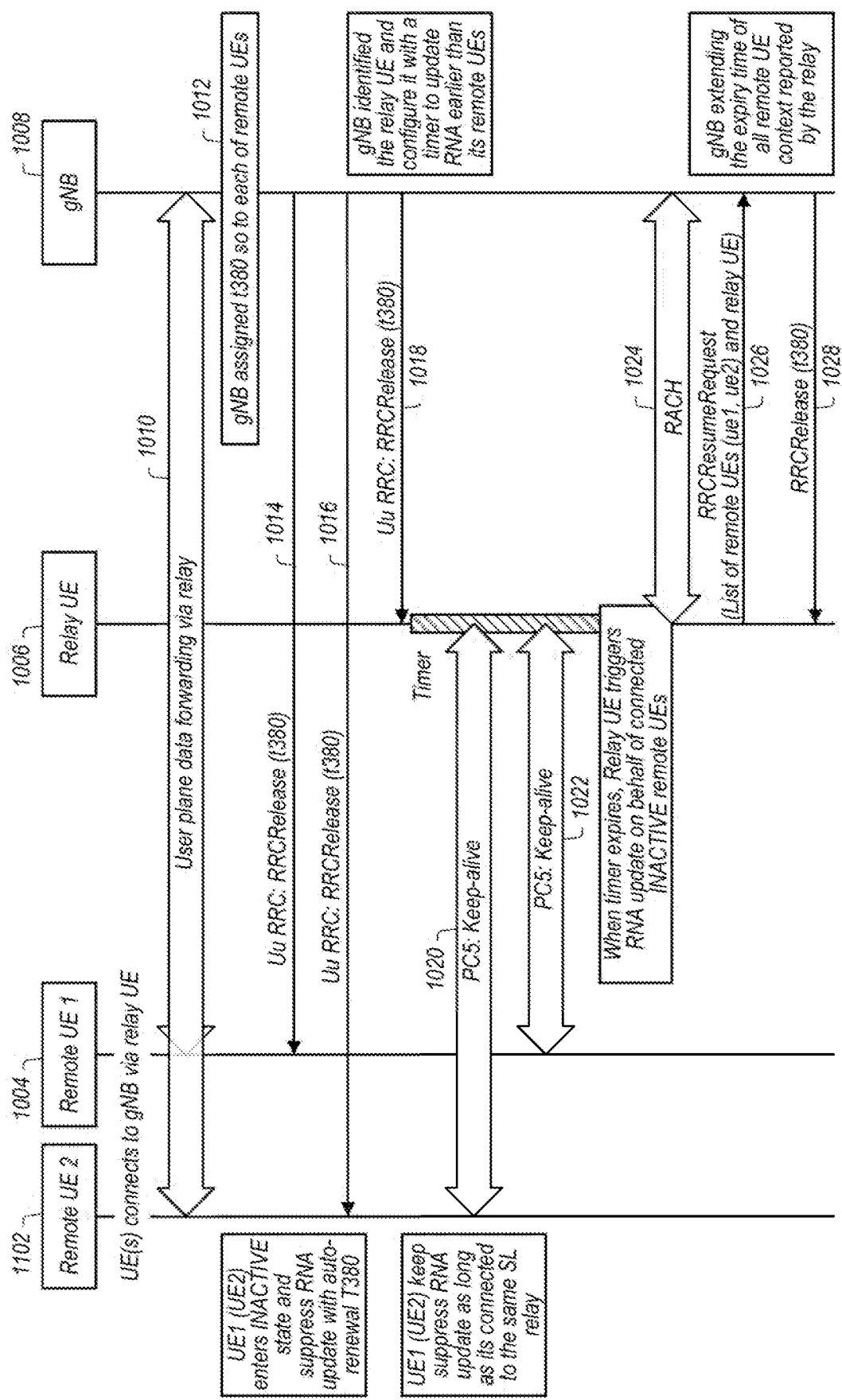
FIG. 17 is a communication flow diagram illustrating a method for a relay UE in an RRC inactive state to assist multiple remote UEs in an RNA update procedure, according to some embodiments.

This procedure is described in detail in the communication flow diagram shown in FIG. 17. The method shown in FIG. 17 starts after each of remote UE1 1004 and remote UE2 1002 have each established a relay connection with the gNB 1008 via the relay UE 1006. At 1010, user plane data is forwarded to remote UEs 1 and 2 via the relay UE. At 1012, the gNB assigns a T380 timer to each of the two remote UEs. At 1014 and 1016, the gNB transmits an RRCRelease message to remote UE1 and remote UE2, respectively, via the relay UE, for the remote UEs 1 and 2 to enter the RRC inactive state and suppress RNA updates with autorenewal of the T380 timer.

The gNB configures the relay UE with a T380 timer for performing an RNA update procedure that is earlier that the T380 timers assigned to the remote UEs. At 1018, the gNB transmits an RRCRelease message to the relay UE for the relay UE to start the T380 timer. The relay UE performs keep alive messaging over the PC5 interface with remote UE 1 (1020) and remote UE 2 (1022) while the T380 timer of the relay UE is running.

When the T380 timer of the relay LIE expires, the relay IE triggers an RNA update procedure for remote UEs 1 and 2 and for the relay UE. To trigger the RNA update procedure, the relay UE may perform a random access (RACH) procedure 1024 with the gNB, and transmit an RRCResumeRequest message 1026 to the gNB identifying the remote UEs 1 and 2 and the relay UE. The gNB may extend the expiry time of both remote UEs and respond to the relay UE with an RRCRelease message at 1028 to reset the T380 timer.

Figure 18:
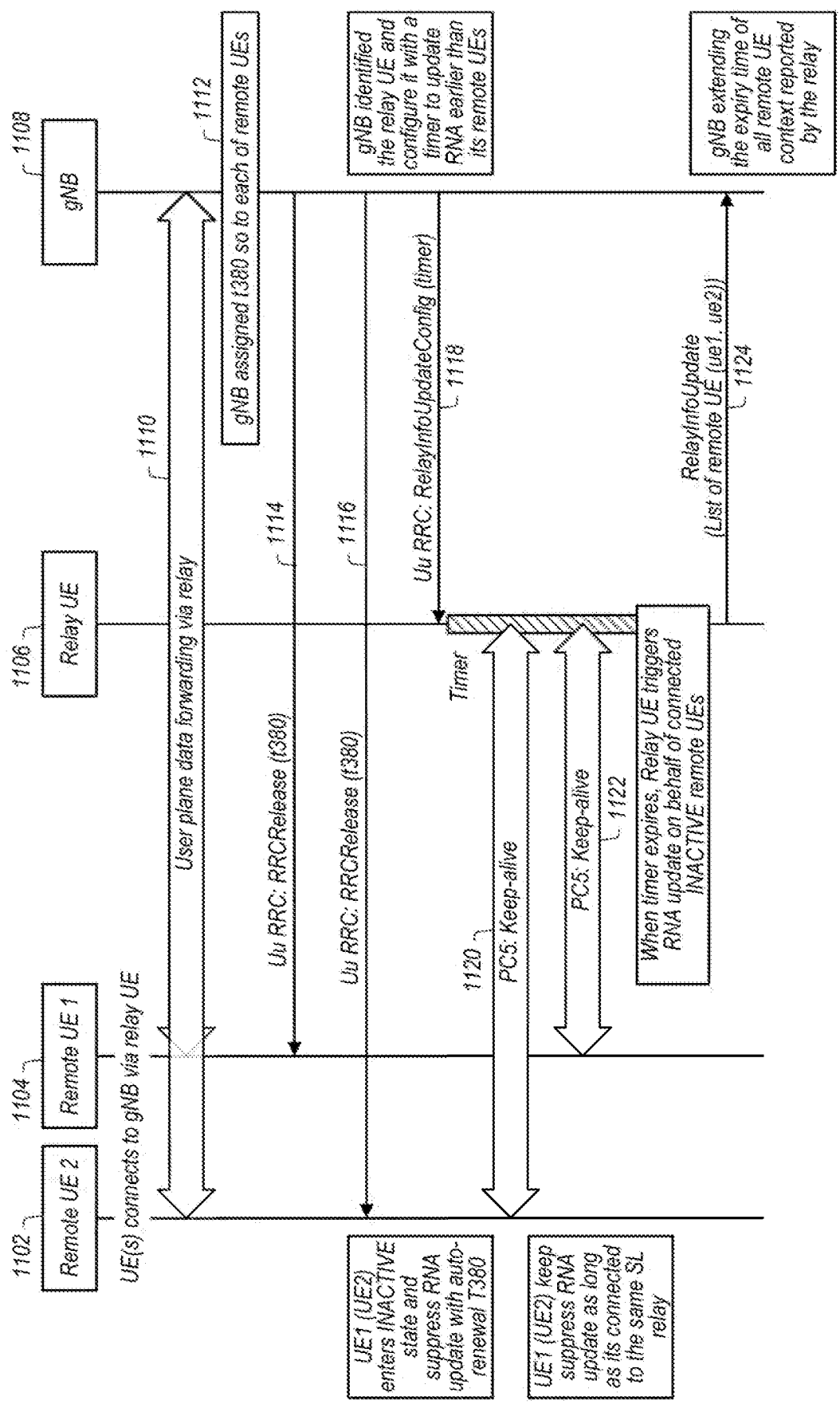
FIG. 18 is a communication flow diagram illustrating a method for a relay UE in an RRC connected state to assist multiple remote UEs in an RNA update procedure, according to some embodiments.

Alternatively, when the relay UE is in the RRC connected state, the gNB may configure a periodic check-in timer with the relay LIE for the relay UE to report connected remote UE(s). In these embodiments, a new Un RRC message may be introduced (e.g., RelayRNAUpdate), which informs the network of the status of one or more remote UEs and/or the relay UE. This procedure is described in detail in the communication flow diagram shown in FIG. 18. The method shown in FIG. 18 starts after each of remote UE1 1104 and remote UE2 1102 have each established a relay connection with the gNB 1108 via the relay UE 1106. At 1110, user plane data is forwarded to remote UEs 1 and 2 via the relay UE. At 1112, the gNB assigns a 34) T380 timer to each of the two remote UEs. At 1114 and 1116, the gNB transmits an RRCRelease message to remote UE1 and remote UE2, respectively, via the relay UE, for the remote UEs 1 and 2 to enter the RRC inactive state and suppress RNA updates with autorenewal of the T380 timer.

The gNB configures the relay UE with a T380 timer for performing an RNA update procedure that is earlier that the T380 timers assigned to the remote UEs. At 1118, the gNB transmits a RelayInfoUpdateConfig message to the relay UE for the relay UE to start an RNA update timer. The relay UE performs keep alive messaging over the PC5 interface with remote UE 1 (1120) and remote UE 2 (1122) while the T380 timer of the relay UE is running.

When the T380 timer of the relay UE expires, the relay UE triggers an RNA update procedure for remote UEs 1 and 2. To trigger the RNA update procedure, the relay UE may transmit a RelayInfoUpdate message 1126 to the gNB identifying the remote UEs 1 and 2. The gNB may extend the expiry time of both remote UEs 1 and 2.

If the relay UE enters the RRC idle state and is unable to do perform RNA update procedures on behalf of the remote UEs, the relay UE may inform the connected remote UE(s) to no longer suppress their UE-triggered RNA update procedures.

Figure 19:
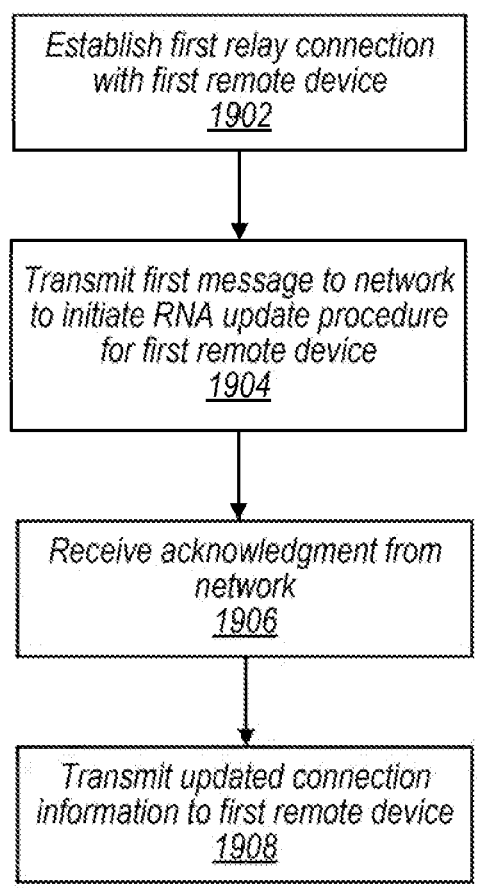
FIG. 19 is a flowchart diagram illustrating a method for a relay UE to assist one or more remote UEs in performing an RNA update procedure, according to some embodiments.

FIG. 19—Flowchart for Relay UE-Assisted RNA Update Procedure

FIG. 19 is a flowchart diagram illustrating a method for a relay UE to assist one or more remote UEs in performing an RNA update procedure, according to some embodiments. Aspects of the method of FIG. 19 may be implemented by a wireless device, e.g., in conjunction with a cellular base station, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. The described method steps may be performed by a UE acting as a relay UE between one or more remote UEs and the network.

Note that while at least some elements of the method of FIG. 19 are described in a manner relating to the use of communication techniques and/or features associated with NR and/or 3GPP specification documents, such description is not intended to be limiting to the disclosure, and aspects of the method of FIG. 19 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 19 may operate as follows.

At 1902, a first relay connection is established with a first remote device. The first relay connection relays communications between the first remote device and a network. In some embodiments, the relay UE may additionally establish a second relay connection with a second remote device, where the second connection relays communications between the second remote device and the network. The relay UE may additionally establish relay connections with one or more third remote UEs.

In some embodiments, the relay UE receives timer information from the first and/or second remote UEs. The timer information may include a T380 timer for the respective remote UE, and expiration of the T380 tinier may indicate that the respective remote UE is scheduled to perform an RNA update procedure. Alternatively, in some embodiments, the relay UE receives timer information (e.g., T380 timer values) directly from the network related to the RNA update procedure for the first remote device and/or the second remote device. In these embodiments, the network may have previously configured the first and/or second remote devices to enter the RRC inactive state and suppress RNA updates, whereas the network transmits timer information directly to the relay UE for performing RNA updates on behalf of the remote UE(s). In some embodiments, the relay UE transmits keep alive messages to the first remote UE and/or the second remote UE over a PC5 interface prior to expiration of the timer(s).

At 1904, a first message is transmitted to the network (e.g., to a gNB) to initiate a radio 1s access network-based notification area (RNA) update procedure for the first remote device. In some embodiments, when the relay UE is in the RRC inactive state, the first message may additionally initiate the RNA update procedure for the relay UE. In some embodiments, the first message is transmitted to the network in response to expiration of a T380 timer associated with a remote UE. When the relay UE is servicing multiple remote UEs, the relay UE may transmit the first message in response to the first expiration of any of the T380 timers of the remote UEs. Regardless of whether the T380 timers are received by the relay UE from the remote UE(s) or from the network, the relay UE may monitor the T380 timers to determine when a T380 timer has expired to trigger transmitting the first message to initiate the RNA update procedure. The network may update the UE context for the remote UE(s) and/or the relay UE in response to receiving the first message.

In some embodiments, the UE has an established connection with the network in an RRC inactive state. In these embodiments, the timer information may be received in an RRC Release message from the network, and the first message may be transmitted to the network as part of a random access request to transition the established connection from the RRC inactive state to an RRC connected state.

Alternatively, in some embodiments the UE has an established connection with the network in an RRC connected state. In these embodiments, the timer information may be received through an RRC configuration message from the network. The timer information may include a periodic check-in timer for the UE to periodically transmit messaging to initiate RNA update procedures.

At 1906, an acknowledgment message is received from the network comprising updated connection information for the first remote device. The acknowledgment message may specify a next time for the first remote UE, second remote UE, and/or the relay UE to perform a subsequent RNA update procedure.

At 1908, the updated connection information is transmitted for the first remote device to the first remote device. When the relay UE is servicing multiple remote UEs, the relay UE may additionally transmit respective updated connection information to the other remote UEs well. The remote UEs may reset their respective T380 timers responsive to receiving the updated connection information. Alternatively, when the T380 timers are maintained directly by the relay UE, the relay UE may reset the T380 timer(s) upon receiving the acknowledgment message from the network.

Another exemplary embodiment may include a device, comprising: an antenna; a radio coupled to the antenna; and a processing element operably coupled to the radio, wherein the 13 device is configured to implement any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A user equipment device (UE), comprising:
a radio; and
a processor operably coupled to the radio, wherein the UE is configured to:
establish a first relay connection with a first remote device, wherein the first relay connection relays communications between the first remote device and a network;
establish a second relay connection with a second remote device, wherein the second relay connection relays communications between the second remote device and the network,
transmit a first message to the network to initiate a radio access network-based notification area (RNA) update procedure for the first remote device, for the second remote device, and for the UE;
receive an acknowledgment message from the network comprising updated connection information for the first remote device and updated connection information for the second remote device;
transmit the updated connection information for the first remote device to the first remote device; and
transmit the updated connection information for the second remote device to the second remote device.

2. The UE of claim 1, wherein the UE is further configured to:
receive first timer information from the first remote device;
determine, based on the first timer information, that a timer associated with the first remote device has expired, wherein the first message is transmitted to the network responsive to determining that the timer has expired.

3. The UE of claim 2, wherein the UE is further configured to:
transmit keep alive messages to the first remote UE over a PC5 interface prior to expiration of the timer.

4. The UE of claim 1, wherein the UE is further configured to:
receive first timer information from the first remote device;
receive second timer information from the second remote device; and
determine, based on the first or second timer information, that a timer associated with either the first or second remote devices has expired,
wherein the first message is transmitted to the network responsive to determining that the timer has expired.

5. The UE of claim 4,
wherein the timer comprises a T380 timer.

6. The UE of claim 1, wherein the UE is further configured to:
receive timer information from the network related to the RNA update procedure for the first remote device,
determine, based on the timer information, that a timer associated with the first remote device has expired,
wherein the first message is transmitted to the network responsive to determining that the timer has expired.

7. The UE of claim 6,
wherein the UE has an established connection with the network in a radio resource control (RRC) inactive state,
wherein the timer information is received in an RRC Release message from the network, and
wherein the first message is transmitted to the network as part of a random access request to transition the established connection from the RRC inactive state to an RRC connected state.

8. The UE of claim 6,
wherein the UE has an established connection with the network in a radio resource control (RRC) connected state, and
wherein the timer information is received through an RRC configuration message from the network.

9. The UE of claim 6,
wherein the UE has an established connection with the network in a radio resource control (RRC) connected state, and
wherein the timer information comprises a periodic check-in timer for the UE to periodically transmit messaging to initiate RNA update procedures.

10. An apparatus, comprising:
a processor configured to cause a user equipment device (UE) to:
establish a first relay connection with a first remote device, wherein the first relay connection relays communications between the first remote device and a network;
establish a second relay connection with a second remote device, wherein the second relay connection relays communications between the second remote device and the network,
transmit a first message to the network to initiate a radio access network-based notification area (RNA)

update procedure for the first remote device, for the second remote device, and for the UE;

receive an acknowledgment message from the network comprising updated connection information for the first remote device and updated connection information for the second remote device;

transmit the updated connection information for the first remote device to the first remote device; and transmit the updated connection information for the second remote device to the second remote device.

11. The apparatus of claim 10, wherein the processor is further configured to cause the UE to:

receive first timer information from the first remote device;

determine, based on the first timer information, that a timer associated with the first remote device has expired, wherein the first message is transmitted to the network responsive to determining that the timer has expired.

12. The apparatus of claim 11, wherein the processor is further configured to cause the UE to:

transmit keep alive messages to the first remote UE over a PC5 interface prior to expiration of the timer.

13. The apparatus of claim 10, wherein the processor is further configured to cause the UE to:

receive first timer information from the first remote device;

receive second timer information from the second remote device; and determine, based on the first or second timer information, that a timer associated with either the first or second remote devices has expired, wherein the first message is transmitted to the network responsive to determining that the timer has expired.

14. A method performed by a relay user equipment device (UE), the method comprising:

establishing a first relay connection with a first remote device, wherein the first relay connection relays communications between the first remote device and a network;

establishing a second relay connection with a second remote device, wherein the second relay connection relays communications between the second remote device and the network;

transmitting a first message to the network to initiate a radio access network-based notification area (RNA) update procedure for the first remote device, for the second remote device, and for the UE;

receiving an acknowledgment message from the network comprising updated connection information for the first remote device and updated connection information for the second remote device;

transmitting the updated connection information for the first remote device to the first remote device; and transmitting the updated connection information for the second remote device to the second remote device.

15. The method of claim 14, further comprising:

receive timer information from the network related to the RNA update procedure for the first remote device, determine, based on the timer information, that a timer associated with the first remote device has expired, wherein the first message is transmitted to the network responsive to determining that the timer has expired.

16. The method of claim 15, wherein the UE has an established connection with the network in a radio resource control (RRC) inactive state, wherein the timer information is received in an RRC Release message from the network, and wherein the first message is transmitted to the network as part of a random access request to transition the established connection from the RRC inactive state to an RRC connected state.

17. The method of claim 15, wherein the UE has an established connection with the network in a radio resource control (RRC) connected state, and wherein the timer information is received in through an RRC configuration message from the network.

18. The method of claim 15, wherein the UE has an established connection with the network in a radio resource control (RRC) connected state, and wherein the timer information comprises a periodic check-in timer for the UE to periodically transmit messaging to initiate RNA update procedures.

19. The method of claim 14, further comprising:

receiving first timer information from the first remote device;

receiving second timer information from the second remote device; and determining, based on the first or second timer information, that a timer associated with either the first or second remote devices has expired, wherein the first message is transmitted to the network responsive to determining that the timer has expired.

20. The method of claim 19, wherein the timer comprises a T380 timer.

* * * * *